(12) United States Patent
Woodell

(10) Patent No.: US 7,417,579 B1
(45) Date of Patent: Aug. 26, 2008

(54) WEATHER RADAR WITH SIGNIFICANCE DETERMINATION

(75) Inventor: Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 11 days.

(21) Appl. No.: 11/519,564

(22) Filed: Sep. 12, 2006

(51) Int. Cl.
*G01S 13/95* (2006.01)
*G01S 7/292* (2006.01)
*G01S 7/28* (2006.01)
*G01S 13/00* (2006.01)

(52) U.S. Cl. ............ 342/26 B; 342/26 R; 342/27; 342/73; 342/74; 342/75; 342/82; 342/89; 342/159; 342/175; 342/176; 342/179; 342/192; 342/195

(58) Field of Classification Search ...... 342/26 R–26 D, 342/27, 28, 73–82, 89–93, 175–186, 195, 342/159–164, 192–197
See application file for complete search history.

(56) References Cited

U.S. PATENT DOCUMENTS

| | | | |
|---|---|---|---|
| 3,764,719 A | 10/1973 | Dell | |
| 3,781,530 A * | 12/1973 | Britland et al. | 342/26 B |
| 3,781,878 A | 12/1973 | Kirkpatrick | |
| 3,885,237 A | 5/1975 | Kirkpatrick | |
| 4,043,194 A * | 8/1977 | Tanner | 342/26 B |
| 4,940,987 A | 7/1990 | Frederick | |
| 5,049,886 A | 9/1991 | Seitz et al. | |
| 5,198,819 A | 3/1993 | Susnjara | |
| 5,202,690 A | 4/1993 | Frederick | |
| 5,311,183 A | 5/1994 | Mathews et al. | |
| 5,479,173 A | 12/1995 | Yoshioka et al. | |
| 5,828,332 A | 10/1998 | Frederick | |
| 5,907,568 A | 5/1999 | Reitan, Jr. | |
| 5,920,276 A | 7/1999 | Frederick | |
| 5,945,926 A | 8/1999 | Ammar et al. | |
| 6,138,060 A | 10/2000 | Conner et al. | |
| 6,154,169 A | 11/2000 | Kuntman | |
| 6,184,816 B1 | 2/2001 | Zheng et al. | |
| 6,201,494 B1 | 3/2001 | Kronfeld | |
| 6,236,351 B1 | 5/2001 | Conner et al. | |
| 6,340,946 B1 | 1/2002 | Wolfson et al. | |
| 6,388,607 B1 | 5/2002 | Woodell | |

(Continued)

FOREIGN PATENT DOCUMENTS

WO    WO 98/22834 A1    5/1998

(Continued)

OTHER PUBLICATIONS

Nathanson, Fred E., "Radar and Its Composite Environment," *Radar Design Principles, Signal Processing and the Environment*, 1969, 5 pages, McGraw-Hill Book Company, New York et al.

*Primary Examiner*—Bernarr E. Gregory
(74) *Attorney, Agent, or Firm*—Nathan O. Jensen; Kyle Eppele

(57) ABSTRACT

A weather radar system includes processing electronics. The processing electronics sense weather and determine significant weather based upon the altitude of the weather. The altitude of the weather can be compared to a flight path to determine its significance. A display can provide visual indicia of the significant weather in response to the processing electronics.

20 Claims, 9 Drawing Sheets

U.S. PATENT DOCUMENTS

| | | |
|---|---|---|
| 6,388,608 B1 | 5/2002 | Woodell et al. |
| RE37,725 E | 6/2002 | Yamada |
| 6,424,288 B1 | 7/2002 | Woodell |
| 6,512,476 B1 | 1/2003 | Woodell |
| 6,549,161 B1 | 4/2003 | Woodell |
| 6,577,947 B1 | 6/2003 | Kronfeld et al. |
| 6,597,305 B2 * | 7/2003 | Szeto et al. ............... 342/26 R |
| 6,603,425 B1 | 8/2003 | Woodell |
| 6,650,275 B1 * | 11/2003 | Kelly et al. ............... 342/26 R |
| 6,720,906 B2 * | 4/2004 | Szeto et al. ............... 342/26 R |
| 6,839,018 B2 * | 1/2005 | Szeto et al. ............... 342/26 R |
| 6,879,280 B1 | 4/2005 | Bull et al. |
| 7,109,913 B1 * | 9/2006 | Paramore et al. .......... 342/26 B |
| 2003/0001770 A1 * | 1/2003 | Cornell et al. ............ 342/26 R |

FOREIGN PATENT DOCUMENTS

WO     WO 03/005060 A1 *   1/2003

* cited by examiner

WEATHER RADAR WITH SIGNIFICANCE DETERMINATION

FIELD OF THE INVENTION

The present application relates generally to the identification of weather. More particularly, the present application relates to a method of and a system for identifying weather in the flight path of an aircraft using a weather radar system.

BACKGROUND OF THE INVENTION

U.S. Pat. No. 6,424,288 invented by Daniel L. Woodell and assigned to the assignee of the present application discloses systems for and methods of displaying radar information using weather radar systems. Weather radar systems generally include an antenna, a receiver/transmitter circuit, a processor, and display. The processor is coupled between the display and the receiver/transmitter circuit. The receiver/transmitter circuit is coupled between the processor and the antenna.

The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color multi-function display (MFD) unit that provides color graphical images to represent the severity and location of weather. Some aircraft weather radar systems also include other hazard detection systems such as a turbulence detection system. The turbulence detection system can provide indications of the presence of turbulence or other hazards. Conventional weather radar systems include those manufactured by Rockwell Collins, Inc., Honeywell International, Inc. and others.

U.S. Pat. No. 6,424,288 discloses an airborne weather radar system that can use multiple scans at different tilt angles to generate a single displayed image. The data from the multiple scans can be compared to reduce visual display of ground clutter. Ground clutter refers to weather radar returns that are the result of reflections from the surface of the Earth or objects associated with the ground. The system can use a measure of power changes between beams at different elevations to determine if weather radar returns are from the ground or weather.

Heretofore, weather radar systems have generally been designed to detect all weather that is in view while removing ground clutter from the display. U.S. Pat. No. 6,603,425 invented by Woodell and assigned to the assignee of the present application discloses such a system. However, such weather radar systems tend to collect and display a large amount of weather images and do not limit the number of weather images provided. Such systems do not necessarily meet customer demands because pilots are more interested in a limited view of weather (e.g., a view of only weather that poses a threat to the aircraft). Although certain weather may be in view, the aircraft's altitude may be such that the detected weather poses no threat to the aircraft because the aircraft flies significantly above such weather. In most situations where weather significance needs to be determined, weather will extend from some maximum altitude to some low level. So in those situations the determination of estimated flight path either penetrating or passing above the weather is required to provide situational awareness. In a few cases, such as the takeoff and climb case, determination of the aircraft's clear path underneath overhanging weather is desired.

Thus, there is a need to determine whether weather is within an aircraft's flight path. There is also a need for a system for and a method of determining presence of weather in a flight path of an aircraft using an on-board weather radar system. Further still, there is a need for real time or pseudo-real time determination of weather that is significant to an aircraft. Yet further, there is a need for a weather radar system optimized to determine the relevant weather. Yet further still, there is a need for a system that automatically rejects weather detection well below an aircraft's current and future position. The need for flight path weather detection can best be seen in light of terminal area operation. In one case a climbing aircraft could be climbing above low altitude weather below the flight path. Detection and display of that non-significant weather would in a best case be a distraction to a flight crew. On the other hand the flight crew of an aircraft beginning a descent into an airport needs to know weather conditions at or near the runway surface. While the display of this weather is very useful during descent, display of this weather during other flight phases could cause the crew to deviate around weather threats that do not exist at their altitude. Even further still, there is a need for a weather radar system that only displays weather that is significant to an aircraft. There is further still a need for a display methodology for such significance (e.g., density modulation for weather under the aircraft's flight path altitude or removal of all weather displays of all weather below the flight path or above the estimated flight path).

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a weather radar system. The weather radar system includes processing electronics and a display. The processing electronics sense weather and determine significant weather based upon an altitude of the weather. The display provides visual indicia of the significant weather in response to the processing electronics.

Another exemplary embodiment relates to a method of displaying weather on a display associated with an aircraft weather radar system. The method includes receiving radar returns at a plurality of tilt angles, processing the radar returns to determine a presence of weather, and processing the radar returns to estimate an altitude of the weather. The method also includes providing an indication of the weather if the altitude is within a certain parameter.

Another exemplary embodiment relates to an apparatus for displaying weather for an aircraft. The apparatus includes means for determining the presence of weather from weather radar returns, means for determining an altitude of the weather in response to the weather radar returns, and means for rejecting the weather having an altitude below a threshold associated with a flight path.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
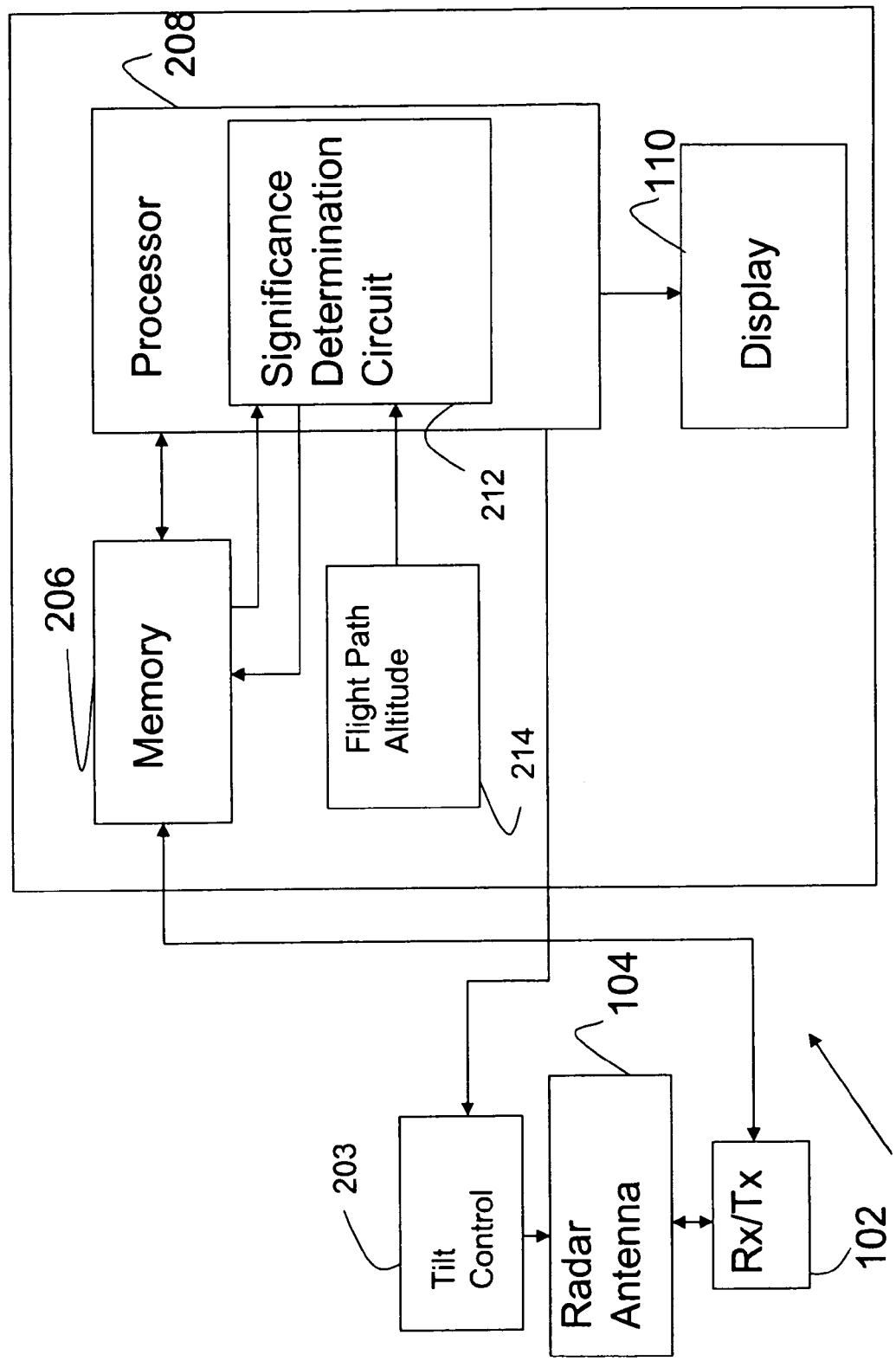
FIG. 1 is a general block diagram of a weather radar system in accordance with an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a weather radar system 200 which may be used on an aircraft is depicted. Weather radar system 200 can be similar to the systems described in U.S. Pat. Nos. 6,603,425 and 6,388,608. In one embodiment, system 200 is an avionics multi-scan system manufactured by Rockwell Collins, Inc. and configured to include a significance determination circuit 212. Alternatively, a volumetric scanning system manufactured by Honeywell, Inc. could be configured to include circuit 212 without departing from the scope of the invention. Significance determination circuit 112 advantageously determines the presence of weather at altitudes, ranges and locations that represent significance to the pilot of an aircraft.

Avionics weather radar system is generally designated 200 and includes a weather radar receiver/transmitter 102, a weather radar adjustable antenna 104, a processor 208, and a multi-scan, multi-tilt angle, memory 206. System 200 also includes a tilt control 203 for automatically controlling the tilt angle (mechanical or electronic) of the antenna 104; this auto control may include an additional manual control feature as well. This automatic tilt control 203 can receive information from other navigation equipment, such as a GPS, inertial navigation system, altimeters, etc., so as to provide for automation of the process of directing the transmitted radar beam at an angle above the radar horizon and at angles at the radar horizon, as well as angle below the radar horizon. The angles above the radar horizon may often be in the range of 1.5 degrees above the horizon. The angle below the horizon is a function of altitude and stage or mode of flight. This navigation equipment need not include, but it may include a georeferenced terrain database for assisting in the determination of the proper radar horizon. The term "radar horizon" is used to refer to the line in front of the aircraft which separates the terrain from the sky. Obviously, the existence of nearby mountains can affect the location of the radar horizon. Additionally, the tilt control 203 can be coupled to a device that provides information relating to the freezing altitude in the area about the aircraft. The antenna can be directed to a point (mechanically or electronically) just below the freezing altitude to maximize radar returns.

Multi-scan, multi-tilt angle, memory 206 is preferably capable of storing in a readily addressable and rapidly retrievable manner, at least two, but preferably four or more, data sets resulting from four or more antenna sweeps at different angles. Although preferred types of memory are discussed as memory 206, system 200 can utilize any type of storage system capable of storing radar returns or associated data for analysis/processing by processor 208. In one alternative embodiment, memory 206 can be a volumetric storage unit.

The data in multi-scan, multi-tilt angle, memory 206 or other storage unit can be used by significance determination circuit 212 to determine weather that should be displayed on display 110. Display 110 can be part of an avionic multi-function display (MFD) unit. Processor 208 can be a multi-scan, multi-tilt angle, weather radar and can perform the customary functions performed by a conventional weather radar return processing unit, plus it can perform several additional operations based upon the additional data available in multi-scan, multi-tilt angle, memory 206. In general, multi-scan, multi-tilt angle, processor 208 can merge or cross qualify portions, or ranges, of the radar returns of several different antenna sweeps at several different tilt angles, so that a single relatively clutter-free image is presented to the pilot based upon the several separate scans.

Processor 208 can operate according to the scanning process of U.S. Pat. No. 6,424,288. System 200 generally operates by transmitting at least two beams at different tilt angles; system 200 can use the GPS, terrain database, etc. to control the tilt control 203. These returns are stored in multi-scan, multi-tilt angle memory 206.

Known ground clutter is removed from each of the returns using well-known ground clutter suppression techniques. Also, ground clutter suppression techniques described in U.S. Pat. No. 6,603,425 could be implemented as well.

Preferably, processor 208 processes weather radar returns to identify or sense the presence of weather in front of or in view of the aircraft. Significance determination circuit 212 assigns significance to the weather based upon its altitude with respect to the flight path altitude. In one embodiment, weather which is at a threshold of 2,000 feet below a flight path threshold altitude is rejected and not provided on display 110.

In another embodiment, resolution for system 200 is adequate to produce complete rejection of weather 2,000 feet below an altitude threshold and no rejection of weather 2,000 feet above an altitude threshold at ranges of greater than 240 nautical miles. The 4,000 foot wide altitude band is wide enough to contain the uncertainty of height estimation. To ensure an aircraft is warned of impending weather penetration, the threshold would generally be placed below the aircraft flight path. In one embodiment, the flight path altitude threshold is 2,000 feet below the altitude of the flight path altitude. Alternatively, different flight path altitude thresholds can also be utilized for the comparison (e.g., altitude of the aircraft, flight path altitude, 1000 ft below the flight path altitude, etc.).

Weather is preferably rejected by analyzing weather radar returns to determine the altitude of the weather and the location of the weather. In one embodiment, a radar beam may be placed along the flight path. Any weather that is detected then represents weather along the flight path. This system can be implemented relatively efficiently and has more limited in range due to the radar beam size, weather outside the flight path as significant weather at longer ranges. Such a system would be useful during the initial stages of takeoff and climb operation. In another more general embodiment, power changes between weather radar returns taken at different antenna tilt angles along with radar range are utilized to estimate the altitude of weather. The altitude of the weather is utilized to determine if weather is within the aircraft's flight path or not (and therefore significant or not). Preferably, the altitude and location of the weather is correlated with the flight path so that the altitude of the weather is compared to the flight path at the same location.

The flight path altitude can be provided by flight path altitude circuit 214. Circuit 214 can be coupled with the Flight Management System (FMS) which provides the flight path altitude associated with the aircraft. Alternatively, vertical rate information or change in aircraft altitude can be used to estimate the aircraft's vertical flight path with only some loss in accuracy and generality. Either all possible locations at these altitudes may be considered on the flight path or only weather at the current aircraft heading can be considered on the flight path for this altitude rate driven system. The flight path can be stored in a memory 206 or other storage for use by processor 208.

Significance determination circuit 212 prevents sensed weather from being provided on display 110 if it does not meet significance criteria. The significance criteria generally involves the altitude of the weather, the altitude of the flight path at the range to (or location of) the weather and the range to (or location of) the weather.

Significance determination circuit 212 can be a hardware or software implemented apparatus. In one embodiment, circuit 212 is a software routine that operates within processor 208. Although shown as part of processor 208, circuit 212 can be a separate circuit or be provided between display 110 and processor 208. According to one embodiment, circuit 212 can be implemented upon its own processor platform.

In one embodiment, significance determination circuit 212 determines the range and altitude associated with the sensed weather. The range and altitude are compared to the flight path altitudes at the sensed weather so that significance determination circuit 292 can completely reject, partially reject, or fully accept sensed weather for display on display 210.

Figure 2:
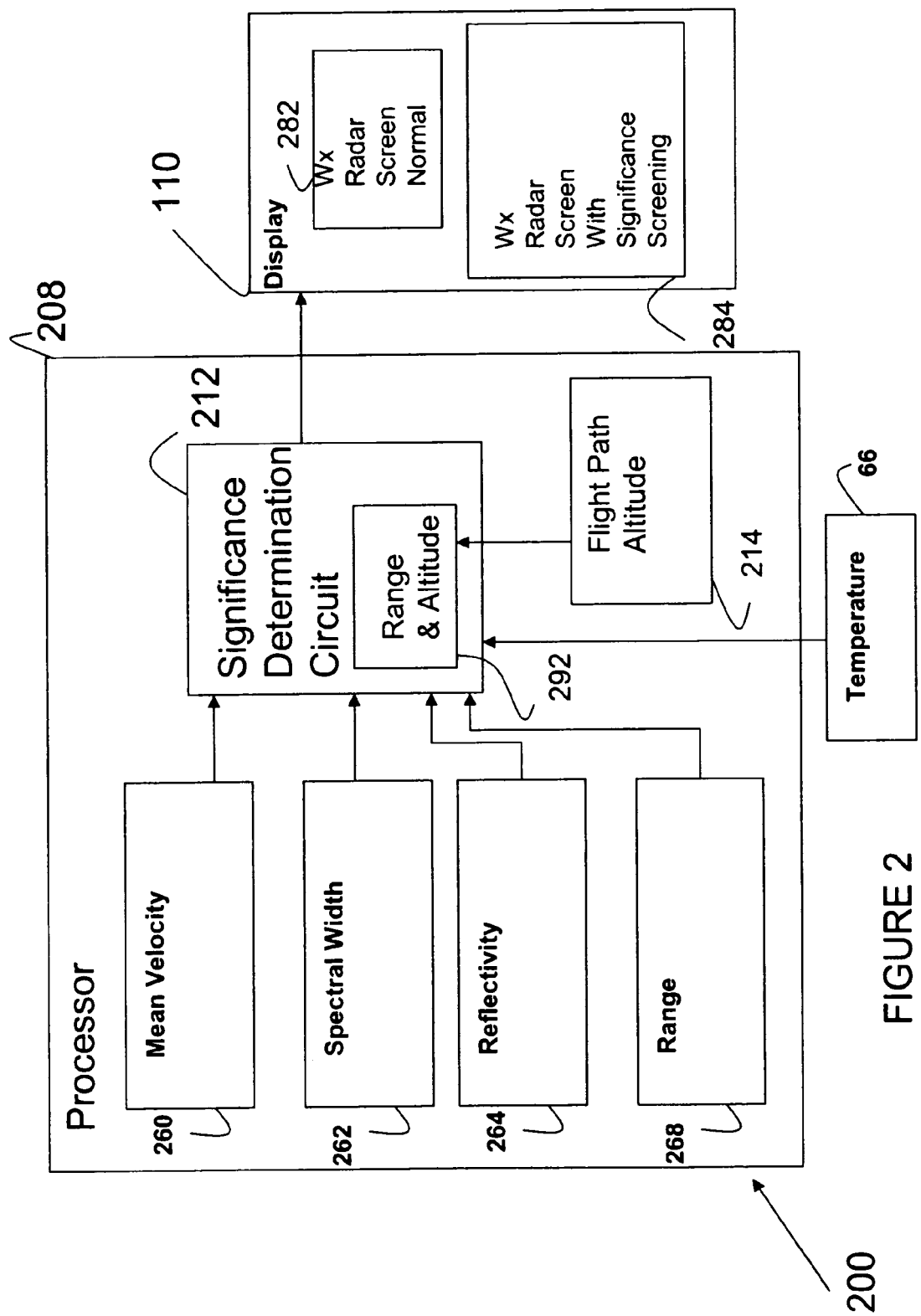
FIG. 2 is a more detailed general block diagram of the weather radar system illustrated in FIG. 1 in accordance with another exemplary embodiment.

With reference to FIG. 2, system 200 can receive additional parameters associated with the weather radar return data. The additional parameters can be utilized for hazard detection as well as for assessing the significance of the weather.

Significance determination circuit 212 can receive a mean velocity parameter 260 and a spectral width parameter 262 derived from weather radar returns. Alternatively, other types of velocity parameters can be utilized. In addition, processor 208 can provide a reflectivity parameter 264 and a range parameter 268 to circuit 212. Computed range or range parameter 268 along with scan angle position can be used to plot the position of weather on display 208. Processor 208 can also provide a temperature parameter 66. Alternatively, a separate temperature sensor 66 can be coupled to processor 208. Parameters 260, 262, 264, and 268 can be computed by processor 208 using data stored in memory 206.

Processor 208 can use parameters 260, 262, 264, and 268 to determine hazards as discussed in U.S. patent application Ser. No. 11/191,883, incorporated herein by reference, filed Jul. 28, 2005, by Woodell et al. and assigned to the assignee of the present application. Parameters 260, 262, 264, and 268 can be used to determine the significance of weather. For example, if processor 208 determines that the weather includes a convective cell that is growing, that characteristic can be considered when determining if the weather is significant. A cell that is capable of growing to an altitude that is in the flight path of the aircraft may be significant. In one embodiment, processor 208 can automatically consider the mode of flight of the aircraft in the significance determination.

Display 110 preferably includes a normal mode weather radar screen 82 and a significance mode screen 84. In one embodiment, significance determination circuit 212 acts as a filter to prevent insignificant radar sensed weather from being displayed on display 110 when screen 84 is utilized.

In one embodiment, significance determination circuit 212 utilizes a software routine or circuit 292 for calculating the range and altitude of the weather detected by processor 208 and removes the weather for display on screen 284 when the weather does not meet specific range and altitude determinations. In addition, significance determination circuit 212 can adjust the symbology associated with insignificant weather. Rather than showing insignificant weather in a conventional fashion, cross hatching, outlines, display density modulation or other indicia can be utilized to indicate that the weather is insignificant with respect to the flight path. In addition, certain weather could be downgraded with regard to its indication as a hazard or with regard to its intensity based upon whether circuit 212 determines that the weather is significant or insignificant. In this way, circuit 212 can operate as a modulator to reduce the intensity indications of weather that is not significant to the flight path of the aircraft, thereby allowing the pilot to pay more attention to the most significant weather.

In one preferred embodiment, the pilot can toggle between screens 82 and 84 based upon a manual input. Alternatively, screen 84 can automatically be provided on display 110 when the aircraft is in a particular flight mode.

In a preferred embodiment, processor 208 and circuit 212 are implemented in software subroutines. The routines can be executed on one or more digital signal processors associated with system 200. In one embodiment, system 200 uses a hardware platform of a WXR-2100 weather radar system manufactured by Rockwell Collins, Inc. or an RDR 4000 weather radar system manufactured by Honeywell International, Inc. However, the present invention is not limited to any type of hardware platform.

Figure 3:
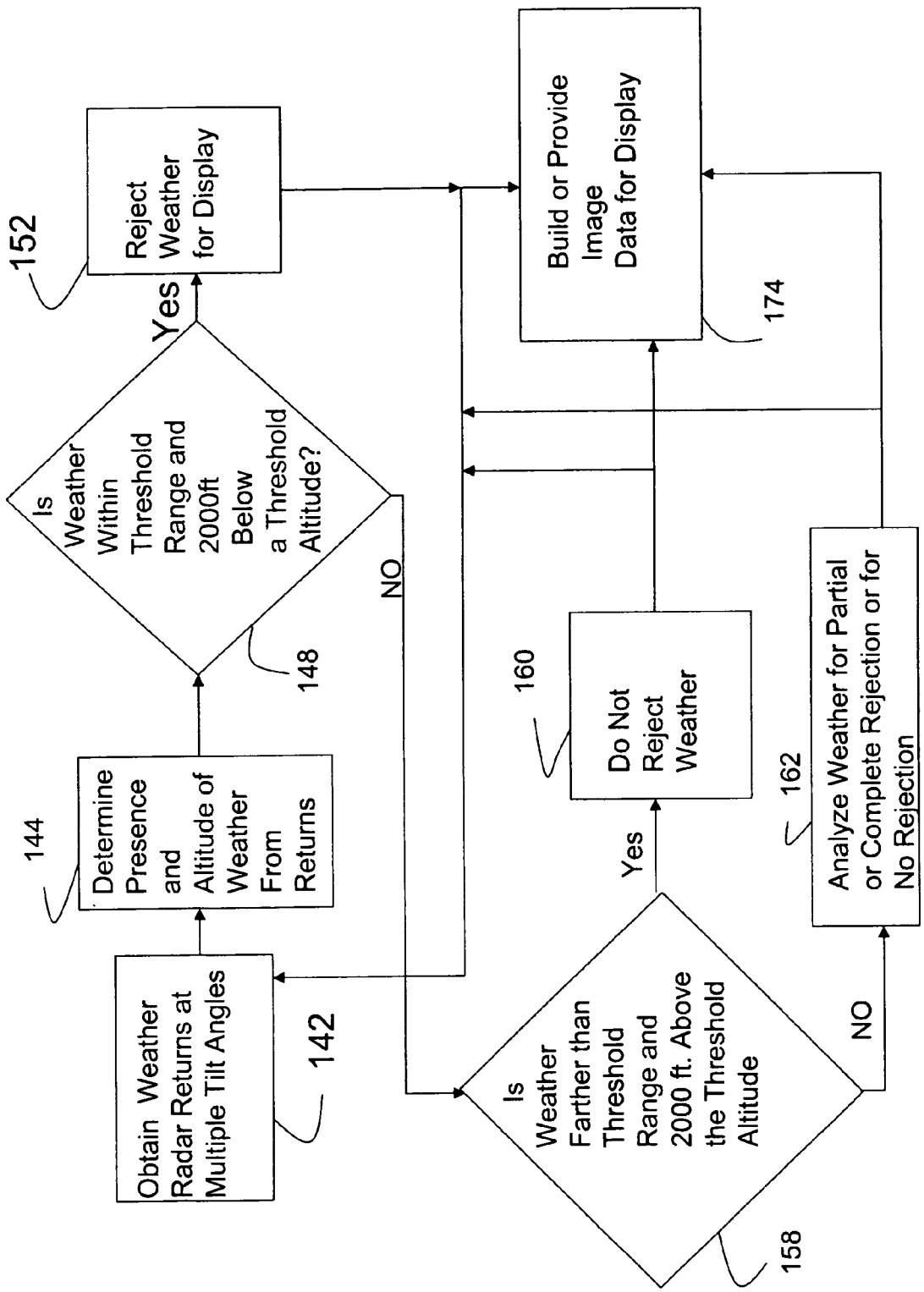
FIG. 3 is a flow chart showing operation of the system illustrated in FIG. 1 in accordance with yet another exemplary embodiment.

With reference to FIG. 3, processor 208 of system 200 provides signals, either directly to receiver/transmitter circuit 102 or indirectly through memory 206, to provide radar beams at radar antenna 104. Preferably, processor 208 is configured to operate system 200 as a pulse Doppler multi-scan, multi-tilt angle radar system or a volumetric radar system in which radar beams are produced at more than one tilt angle. Processor 208 receives radar returns through receiver/transmitter circuit 102.

Processor 208 can receive the radar returns (or signals/data related thereto) directly or through memory 206 at a step 142. Receiver/transmitter circuit 102 can be a single path or can have separate circuits for a receive path and a transmit path. Processor 208 preferably determines power associated with the radar returns.

At a step 144, processor 208 processes the weather radar returns to determine the presence of weather and the altitude and range of weather. In one embodiment, the altitude of weather can be determined by comparing power levels of radar returns at different tilt angles. Significance determination circuit 212 can use a subroutine or circuit 216 to determine the range and altitude of the weather and correlate that range and altitude with the flight path.

The existence of weather at a given altitude can be estimated in a manner similar to that used for ground clutter suppression. According to such a technique, a given ratio of powers generated in the overlapping beams can be mapped to a single angle within that overlapping beam set. Knowing this mapping, aircraft altitude, target range, and beam set pointing angle; any power return ratio can be determined whether it is produced by a target in the vicinity of ground. A non-real time computation can be made for a quantized altitude set over all possible altitude cases and all range extents to determine the power ratios for possible ground targets. The result of this non-real-time calculation could be a look-up table of threshold values as a function of altitude and range or a set of polynomials selected by aircraft altitude that produce the threshold value as a function of radar range. After the addition of a margin term, the power ratio that is generated from the table or polynomial is then used in the real time processes of the radar to determine whether a target is a ground target or not.

In a similar fashion, the existence of weather at some given altitude can be determined. A vertical weather model of radar reflectivity verses altitude is assumed. One such model could have a constant radar reflectivity from the ground to maximum altitude of interest. Again for each quantized altitude with known antenna pointing angles, a non-real-time calculation can integrate radar reflectivities over each of the overlapping beams and the differences in return power between beams computed. For that beam set and weather model type, the change in power between the two beams can be computed for weather targets at the altitude of the aircraft for each possible range. Larger power differences are generated from targets below the threshold altitude while targets that produce less power differences are produced from targets that extend above the altitude of interest.

The thresholds at altitudes different from the aircraft's altitude are computed to determine weather existence along the flight path. Determining weather existence at these different altitudes begins with the same non-real-time computation but that computation is extended to produce the local slope of the power difference in terms of dB verses altitude in feet. In one embodiment, the real time radar process computes both the original delta power estimate for the aircraft's altitude at each radar range and also the slope of the local delta power estimate verses altitude. The difference in altitude between the aircraft and the altitude of interest along the flight path is multiplied by the local slope and added to the original threshold computed for the aircraft's altitude.

Other methods could be used such as pre-computing power delta beam power estimates for likely descent and assent angles, such as the 3 degree glide slope path. Other variations include changing vertical weather models. Vertical models could also be used that express the typical fall-off in radar reflectivity verses altitude for different weather environment types. This may be done to improve weather altitude estimation accuracy. Models that do not extend to the ground can also be used. But since typical radar tilts place these regions close to the ground far away from the center of most beam sets, whether weather extends to the ground or not does not make a substantial difference in computed delta powers.

At a step 148, significance determination circuit 212 determines if the weather is within a threshold range and at least a threshold number of feet below a threshold altitude. In one embodiment, the threshold number is 2,000 feet below a flight path threshold altitude. The flight path threshold altitude is preferably 2,000 feet below the altitude of the aircraft according to the flight plan. Alternatively, the threshold can be the actual, real time altitude of the aircraft.

At a step 152, processor 208 rejects the weather for display on display 110 if the weather is within the threshold range and is at least a predetermined number of feet below the threshold altitude. At a step 174, image data is provided for eventual conversion to a display signal for display 110. The image data is for providing visual indicia of significant weather.

At step 148, if the weather is not within the threshold range or is above the predetermined amount above the threshold altitude, processor 208 advances to a step 158. In step 158, processor 208 determines if the weather is farther away than a threshold range and if the weather is above a predetermined amount above the threshold altitude. In one embodiment, the predetermined amount can be 2000 feet and the threshold altitude can be 2,000 feet below the altitude associated with a flight plan. If the weather is farther than the threshold range and above the predetermined amount above the threshold altitude, processor 208 advances to step 160 and does not reject the weather for display. After step 160, processor 208 advances to step 174 where image data is provided for display 110, including the non-rejected weather from step 160.

If the weather is not farther than the threshold range or is not the predetermined amount above the threshold altitude, processor 208 advances to step 162 and analyzes the weather for partial or complete rejection or for no rejection at all. Since a hard threshold decision could make weather just at the threshold blink on and off on radar display 110, the effects of the threshold decision are generally softened from full weather rejection to full weather passage over some range around the threshold. After step 162, processor 208 advances to step 164 where image data is provided for display 110. After step 164, processor returns to step 144. Once the image data is complete, processor 208 can return to step 142 and process more weather radar returns to sense weather.

Figure 4:
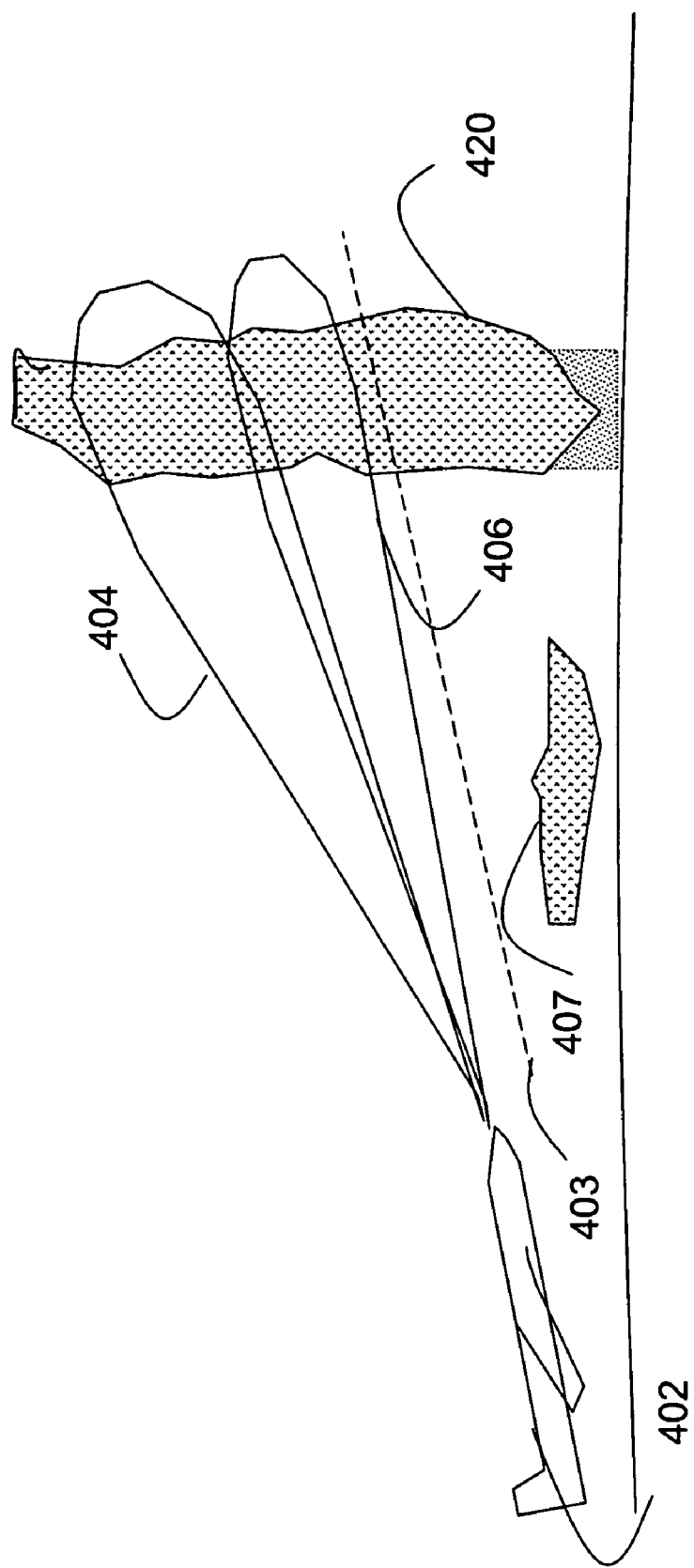
FIG. 4 is a drawing showing the operation of the system illustrated in FIG. 1 in take-off mode.

With reference to FIG. 4, an aircraft 402 is shown having a flight path parallel with threshold 403. Threshold 403 is preferably 2,000 feet below the flight path altitude of aircraft 402.

The weather radar system associated with aircraft 402 provides radar beams 404 and 406 to determine the presence of weather regions 407 and 420. Region 407 is rejected from being displayed on the weather radar system associated with aircraft 402 because it is 2,000 feet below threshold 403. Weather 420 is not rejected because it is at least partially above threshold 403.

Figure 5:
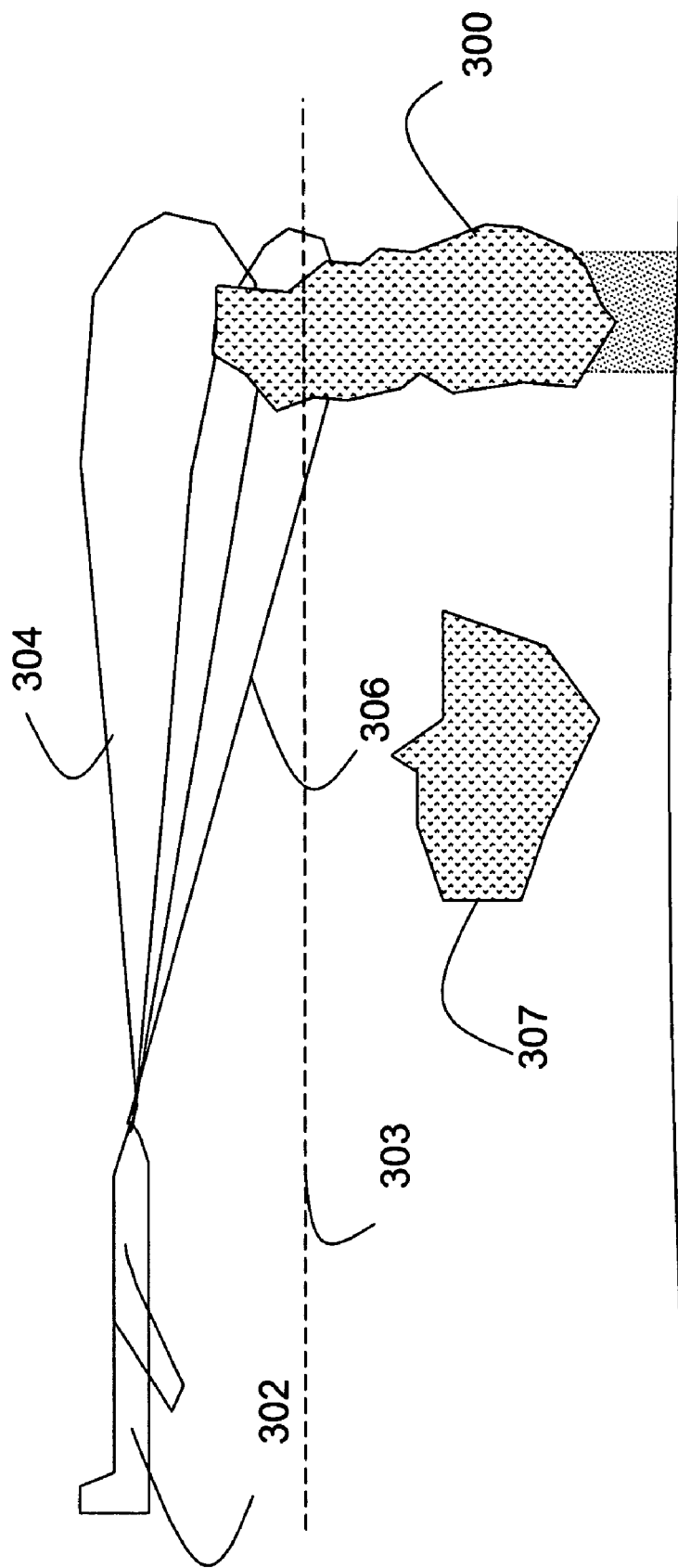
FIG. 5 is a drawing showing the operation of the system illustrated in FIG. 1 in a cruise mode.

With reference to FIG. 5, aircraft 302 is in a cruise mode and a threshold 303 is 2,000 feet below the flight plan associated with aircraft 302. The weather radar system of aircraft 302 provides radar beams 304 and 306. Weather 307 is rejected from display on the weather radar system because it is 2,000 feet below threshold 303. However, weather 300, which is at a greater range and above threshold 303, is provided on the weather radar display.

Figure 6:
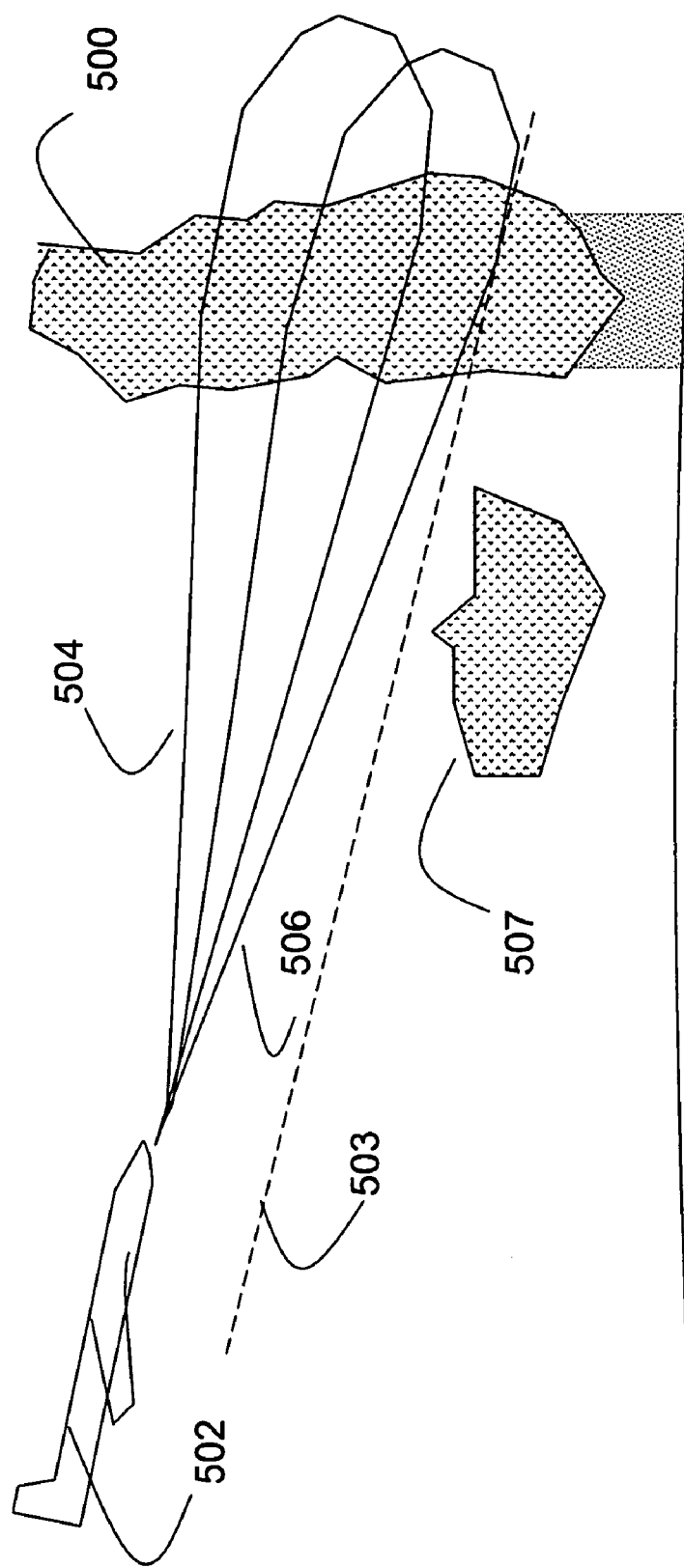
FIG. 6 is a drawing showing the operation of the system illustrated in FIG. 1 in a descent mode.

With reference to FIG. 6, aircraft 502 is shown in a descent mode. A threshold 503 falls 2,000 feet below the flight path of aircraft 502. Aircraft 502 provides radar beams 504 and 506 to sense weather 500 and 507. Region 507 is not provided on radar display because region 507 is 2,000 feet below threshold 503. However, region 500 is provided on the display because region 500 is at a greater range and above threshold 503.

Although thresholds 403, 303 and 503 are shown as straight lines, the thresholds may be nonlinear, depending upon the actual flight path of the aircraft. Further, other offsets from the flight plan altitudes can be utilized.

An exemplary mathematical model for significance determination for use by processor 208 is described below. The mathematical model is exemplary only and is not disclosed to limit the invention. Other mathematical models, algorithms, etc., can be utilized without departing from the scope of the invention.

Antenna 104 used in weather radar system 200 generally has gains that fall off at angles away from the center. Gain (G) of such angles may be modeled as a function of elevation and azimuth angles from beam center. Assume a gain model is used (Equation 1). Peak gain generally occurs at zero degrees for both the elevation axis, phi ($\phi$) and the azimuth axis, theta ($\theta$). The beam is Gaussian in shape with typical X-band weather radars having responses down to ½ there peak gain at about +/−1.7 degrees. According to Equation 1, $$G = F(\theta, \phi)$$

Figure 7:
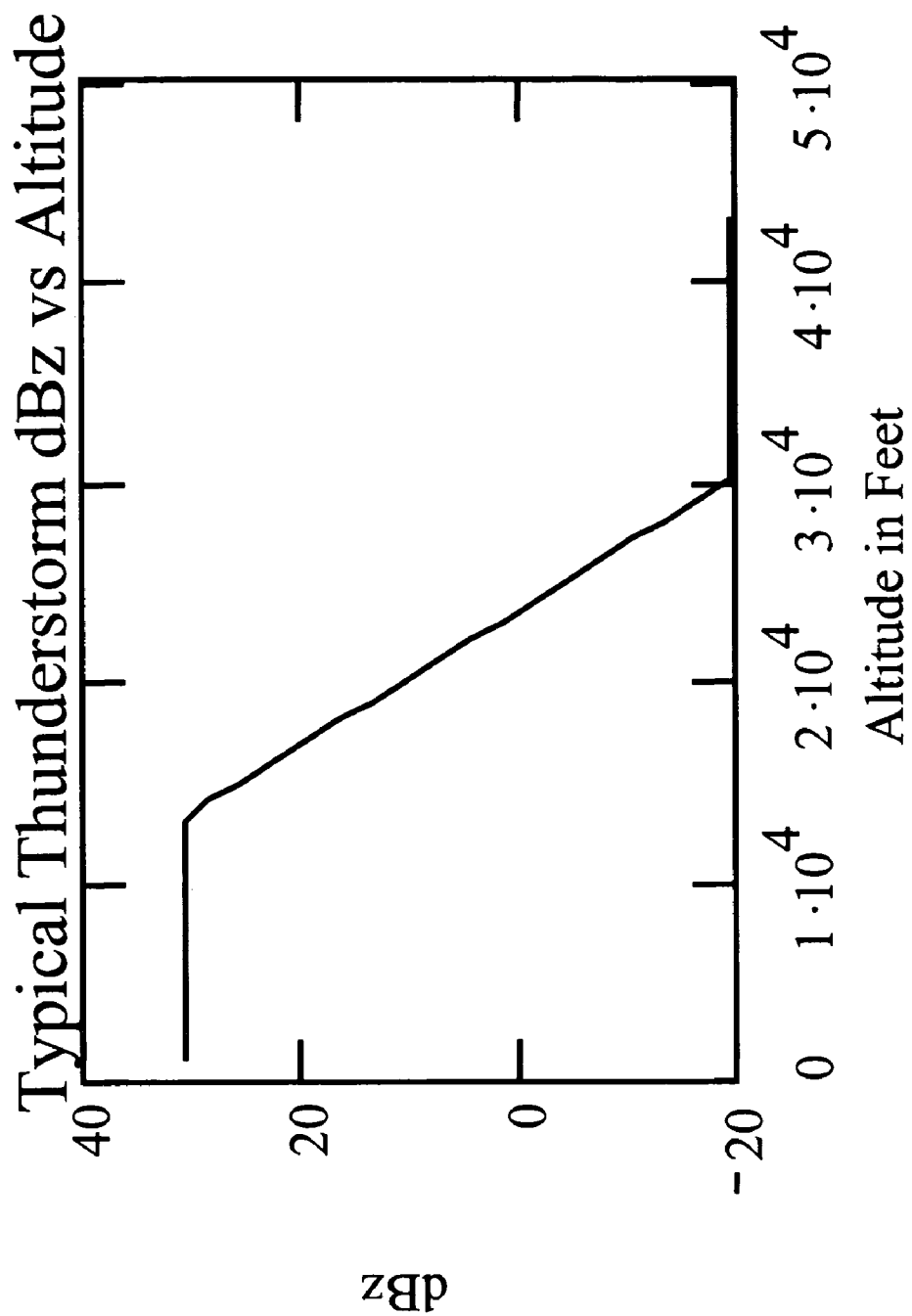
FIG. 7 is an exemplary graph showing an exemplary thunderstorm model of dBz level versus altitude, the graph is related to an exemplary mathematical model for significance determination.

The change in radar returns can be modeled as a function of weather height and type (Equation 2). The model of radar reflectivity, dBz, will be similar to the summer convective cell model of dBz level verses altitude. An exemplary summer convective cell model is shown in FIG. 7.

According to Equation 2, $$Z = F(\text{Alt}, \text{Type})$$

Figure 8:
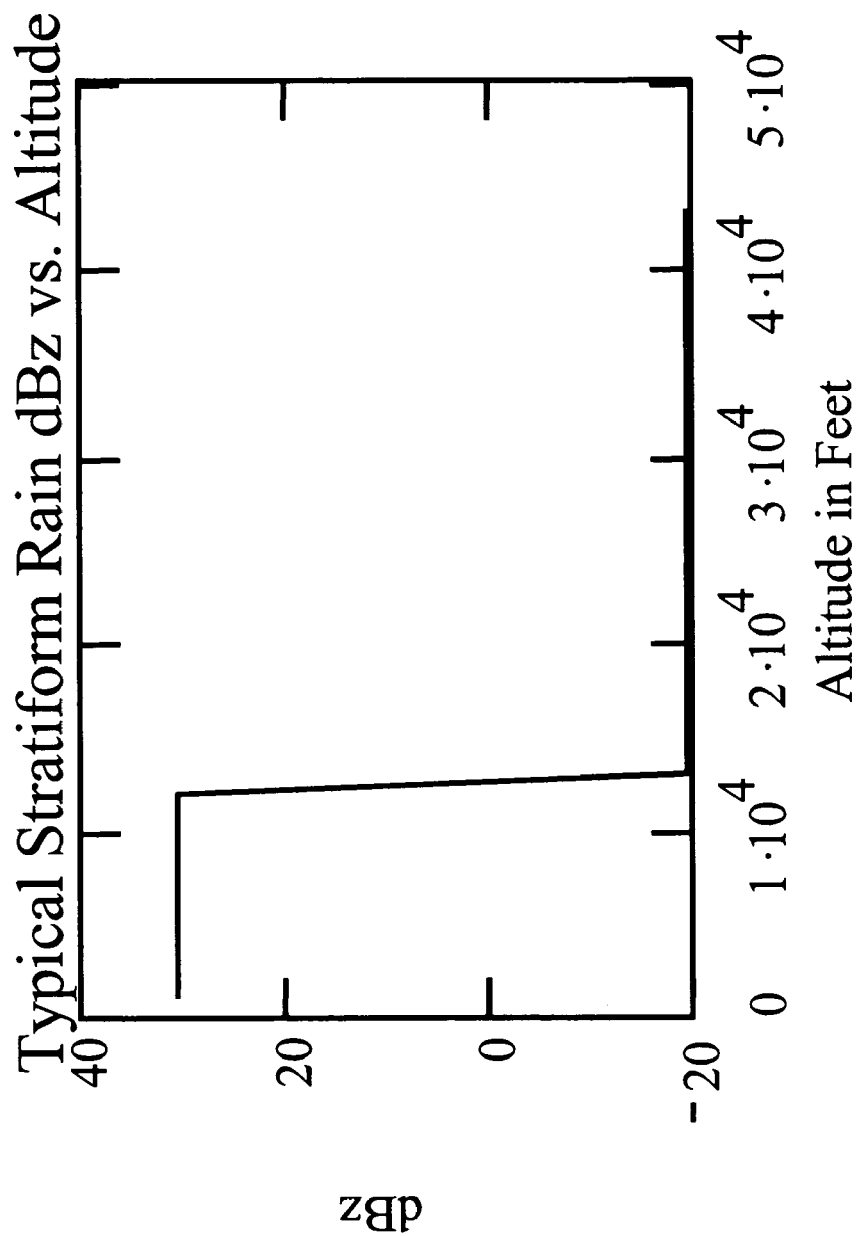
FIG. 8 is an exemplary graph showing an exemplary stratiform rain model of dBz versus altitude, the graph is related to an exemplary mathematical model for significance determination.

Other weather types have different models. Most stratiform weather systems have much lower peak altitudes and generally have precipitations profiles that are more uniform with changes in altitude. A stratiform rain model versus altitude is shown as an example in FIG. 8. Peak radar reflectivities are generally less than those seen in the convective model. Since responses from the radar antenna beams can be integrated across multiple overlapping beams and the quotient used, the absolute values of reflectivities are not important since only the ratios of the beam responses can be used.

The difference in radar returns from two overlapping beams at slightly different elevations may be computed by integrating over the antenna beam with a given weather model. See Equation 3. The difference is given in dB. Transmitter pulse lengths, pulse powers, and other scaling factors are not needed since the ratio is the desired output. According to Equation 3, $$\delta\text{dB} = 10 \cdot \log \left[ \frac{\int_{-ElevNull}^{ElevNull} \int_{-AzNull}^{AzNull} G(\theta, \phi_{lower}) \cdot Z_{model}(LowerBeamHeight) d\theta d\phi_{lower}}{\int_{-ElevNull}^{ElevNull} \int_{-AzNull}^{AzNull} G(\theta, \phi_{upper}) \cdot Z_{model}(UpperBeamHeight) d\theta d\phi_{upper}} \right]$$

This integration assumes the radar beam is roughly parallel to the surface of the earth. The computation can be modified to compute the radar's sample altitude from the elevation pointing angle of the radar system and the individual two radar elevation beam angles. A modification of Equation 3 is Equation 4 which follows.

$$\delta\text{dB} = 10 \cdot \log \left[ \frac{\int_{-ElevNull}^{ElevNull} \int_{-AzNull}^{AzNull} G(\theta, \phi) \cdot Z_{model}(\text{Altitude} + \text{Range} \cdot \sin(\phi_{lowerCenter} + \phi)) d\theta d\phi}{\int_{-ElevNull}^{ElevNull} \int_{-AzNull}^{AzNull} G(\theta, \phi) \cdot Z_{model}(\text{Altitude} + \text{Range} \cdot \sin(\phi_{upperCneter} + \phi)) d\theta d\phi} \right]$$

For the typical elevation angles used in weather radar, the small angle approximation may be used to remove the sin term if the angles are represented in radian form according to Equation 5. According to Equation 5, $$\delta\text{dB} = 10 \cdot \log \left[ \frac{\int_{-ElevNull}^{ElevNull} \int_{-AzNull}^{AzNull} G(\theta, \phi) \cdot Z_{model}[\text{Altitude} + \text{Range} \cdot (\phi_{lowerCenter} + \phi)] d\theta d\phi}{\int_{-ElevNull}^{ElevNull} \int_{-AzNull}^{AzNull} G(\theta, \phi) \cdot Z_{model}[\text{Altitude} + \text{Range} \cdot (\phi_{upperCneter} + \phi)] d\theta d\phi} \right]$$

This estimation of delta dBz between radar beams is shown for a simple flat earth system. The integration could include the effects of curvature of the earth and variable index of refraction with height but is shown in its simplest form, for a flat earth. The classic 4/3 earth diameter approximation can be used to compute beam height with more fidelity. See Nathanson, *Radar Design Principals*, First Edition McGraw-Hill (1969) pages 28 through 33.

The difference in return power between radar beams can be computed for any weather model and aircraft altitude. Weather that has a higher vertical extent will have a lower difference between antenna beam powers. That lower difference can be exploited to allow the detection of weather with altitudes above the initial weather model. If the initial model is generated to represent the weather situation below the aircraft, weather situations with lower power differences can be used to detection weather at or close to the current aircraft altitude.

Figure 9:
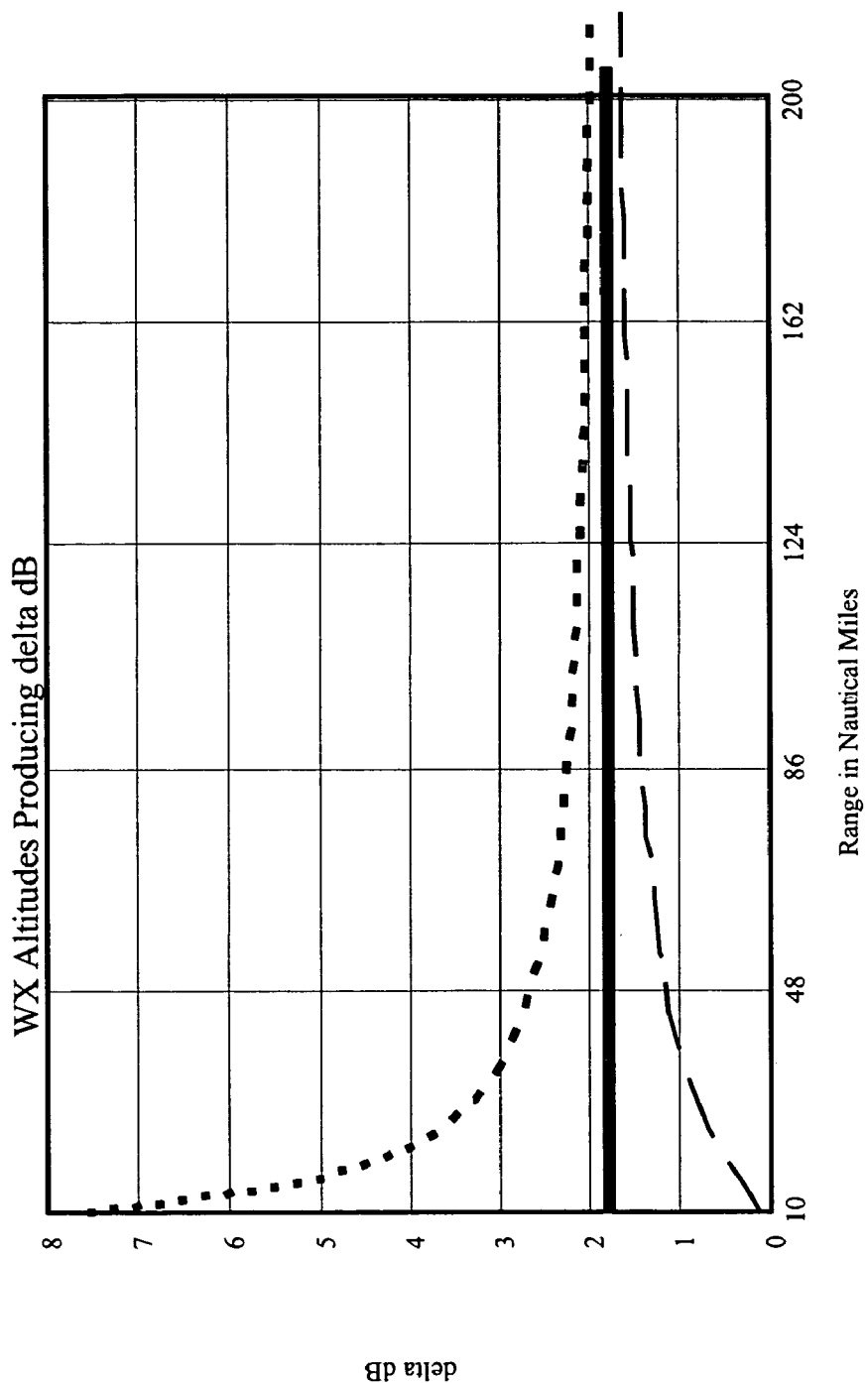
FIG. 9 is an exemplary graph showing an exemplary stratiform weather model for three curves with delta dB on the Y-axis and range on the X-axis, the graph is related to an exemplary mathematical model for significance determination.

As a set of examples, the above equations were used for X-Band weather radar with antenna beams of 3.5 degrees with an aircraft altitude of 14,000 feet. The lower of two beams were aimed at the radar horizon while the upper beam was pointed about 1.5 degrees above the horizon. The weather model was assumed to be stratiform like with a flat top. Three curves were generated for weather with three maximum heights; 12,000 feet, 14,000 feet, and 16,000 feet. The three curves are shown in FIG. 9. The solid curve represents results from weather at 14,000 feet. The top short dashed curve represents results from weather at 12,000 feet and the bottom long dashed curve represents results form weather at 16,000 feet.

The change in beam powers shown above (produced by changing weather altitudes) is very detectable. Return power differences larger than the 1.8 dB in this case can be generated from weather below the aircraft while differences less than 1.8 dB can be generated from weather at and above the aircraft's altitude.

The equations can also be solved for flight paths that are not at a constant altitude. This allows weather significance to be determined during both climbing and descending operation. The equations can be solved in real-time or solved off-line and polynomial representations of the solutions used for real-time use.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow chart shows a preferred exemplary operation only. The specific data types and mathematical operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A multi-scan weather radar system, comprising:
    processing electronics for sensing weather, the processing electronics determining significant weather based upon an altitude of the weather, wherein the processing electronics determines the altitude of the weather by comparing data relating to a first radar return at a first tilt angle with data relating to a second radar return at a second tilt angle; and
    a display, wherein the display provides visual indicia of the significant weather in response to the processing electronics and does not provide visual indicia of non-significant weather.

2. The weather radar system of claim 1, wherein the processing electronics rejects displaying of the weather that is not significant weather.

3. The weather radar system of claim 1, wherein the display includes a significant weather mode and a normal mode.

4. A multi-scan weather radar system, comprising:
    processing electronics for sensing weather, the processing electronics determining significant weather and non-significant weather, based upon an altitude of the weather, and
    a display, wherein the display provides visual indicia of the significant weather in response to the processing electronics and does not provide visual indicia of the non-significant weather;
    wherein the processing electronics rejects displaying of the weather that is the non-significant weather;
    wherein the processing electronics determines altitude of the weather by comparing power of radar returns at different tilt angles.

5. The weather radar display system of claim 4, wherein the altitude is compared to a threshold to determine if the weather is the significant weather.

6. The weather radar display system of claim 5, wherein the threshold is at least 1,000 feet below a flight path altitude of an aircraft, the weather radar display system being disposed on the aircraft.

7. The weather radar system of claim 6, wherein the weather is rejected from being the significant weather if the altitude of the weather is more than 2,000 feet below the threshold at a range within 240 nm.

8. The weather radar system of claim 7, wherein the weather is not rejected from being significant weather if the weather is 2,000 feet above the threshold at a range of 240 nm or more.

9. The weather radar system of claim 5, wherein the threshold is 2,000 feet below the flight path of the aircraft.

10. A method of displaying weather on a display of an aircraft including an aircraft weather radar system, the method comprising:
    receiving radar returns at a plurality of tilt angles;
    processing the radar returns to determine a presence of weather;
    processing the radar returns to estimate an altitude of the weather; and
    displaying a visual indication of the weather on the display if the altitude of the weather is within a certain parameter related to an altitude of a flight path of the aircraft and either displaying a downgraded visual indication of the weather on the display of the weather or displaying no indication of the weather if the altitude is outside of the certain parameter.

11. The method of claim 10, further comprising processing the radar returns to determine a range to the weather.

12. The method of claim 10, wherein the visual indication of the weather is provided if the altitude is above 2,000 feet below the flight path.

13. The method of claim 10, wherein the visual indication of the weather is provided if the altitude of the weather is above the flight path and at a range of 240 nm or more.

14. The method of claim 10, wherein the downgraded visual indication of the weather if the altitude is outside the certain parameter is provided as an outline.

15. The method of claim 10, wherein the visual indication of the weather is provided in response to a mode of flight.

16. An apparatus for displaying weather on a display of an aircraft, the apparatus comprising:
    means for determining a presence of weather from weather radar returns;
    means for determining an altitude of the weather in response to the weather radar returns;
    means for rejecting or downgrading a visual indication to be dissolved on the display of the weather having an altitude below a threshold associated with a flight path; and
    means for providing the visual indication to the display.

17. The apparatus of claim 16, wherein the means for determining a presence is implemented using software.

18. The apparatus of claim 16, wherein the weather is rejected according to rejection display mode.

19. The apparatus of claim 16, wherein the weather is displayed on a weather radar display.

20. The apparatus of claim 19, wherein the altitude is determined by comparing power levels of returns at different tilt angles.

* * * * *